United States Patent [19]

Morris et al.

[11] 4,116,256
[45] Sep. 26, 1978

[54] TIRE BUFFING APPARATUS

[75] Inventors: Jerry M. Morris; Leon Jay Cole; Vaughn Rawls, all of Lima, Ohio

[73] Assignee: National-Standard Company, Niles, Mich.

[21] Appl. No.: 679,361

[22] Filed: Apr. 22, 1976

[51] Int. Cl.$^2$ .......................................... B29H 21/08
[52] U.S. Cl. ....................................... 157/13; 51/5 B
[58] Field of Search .................. 157/13; 51/5 A, 5 B, 51/51, 106 R, 166 R, DIG. 33

[56] References Cited

U.S. PATENT DOCUMENTS

| 2,610,446 | 9/1952 | Hawkinson | 157/13 |
| 2,945,534 | 7/1960 | Hawkinson | 157/13 |
| 2,965,162 | 12/1960 | Hawkinson | 157/13 |
| 2,985,231 | 5/1961 | Roesch | 157/13 |
| 3,117,047 | 1/1964 | Capistrant et al. | 157/13 X |
| 3,584,673 | 6/1971 | Lehmann | 157/13 |
| 3,877,506 | 4/1975 | Mattox et al. | 157/13 |

Primary Examiner—James L. Jones, Jr.
Assistant Examiner—James G. Smith
Attorney, Agent, or Firm—Emrich, Root, O'Keeffe & Lee

[57] ABSTRACT

Apparatus for preparing the peripheral surface of a tire casing to receive tread material for recapping or retreading the tire casing. The apparatus has two or more buffing wheels, a first being a rough cutter for removing, say, 90 percent of the old rubber, and one or more others which have finer cutting or grinding means on their surfaces, called "texturizing" wheels and/ or "finishing" wheels to so buff the surface of the casing, or selected parts thereof, that the new tread stock will adhere satisfactorily to the buffed crown and shoulder areas of the casing and also to produce a finer surface finish at the junction of the new tread and the old casing for the sake of good appearance. The apparatus also has a power driven mandrel mechanism or rim upon which the casing is mounted for rotation on its normal axis. The rim is carried on an articulated frame which is pivotable or swingable on or about an axis or axes extending normally to the casing axis and which is movable to translate the casing toward and away from the cutting wheels. The movement of the casing into and during engagement with the cutting wheels is controlled by a tire profile template for the particular size and shape of the casing to be retreaded, as modified by the style or type of the tread to be applied. The template engages a guide surface which normally lies in a plane that is tangential to the surfaces of the cutting wheels. The guide surface may be shifted radially of the cutting wheels as needed in order to further enable the finer texturizing wheels to finish the shoulder areas of the casing as they blend into the sidewalls of the casing, or to enable the casing to be buffed further, for example, to remove more than the usual thickness of old rubber from the surfaces of a casing which has been damaged or to finish a casing of less than standard cross-sectional width.

12 Claims, 20 Drawing Figures

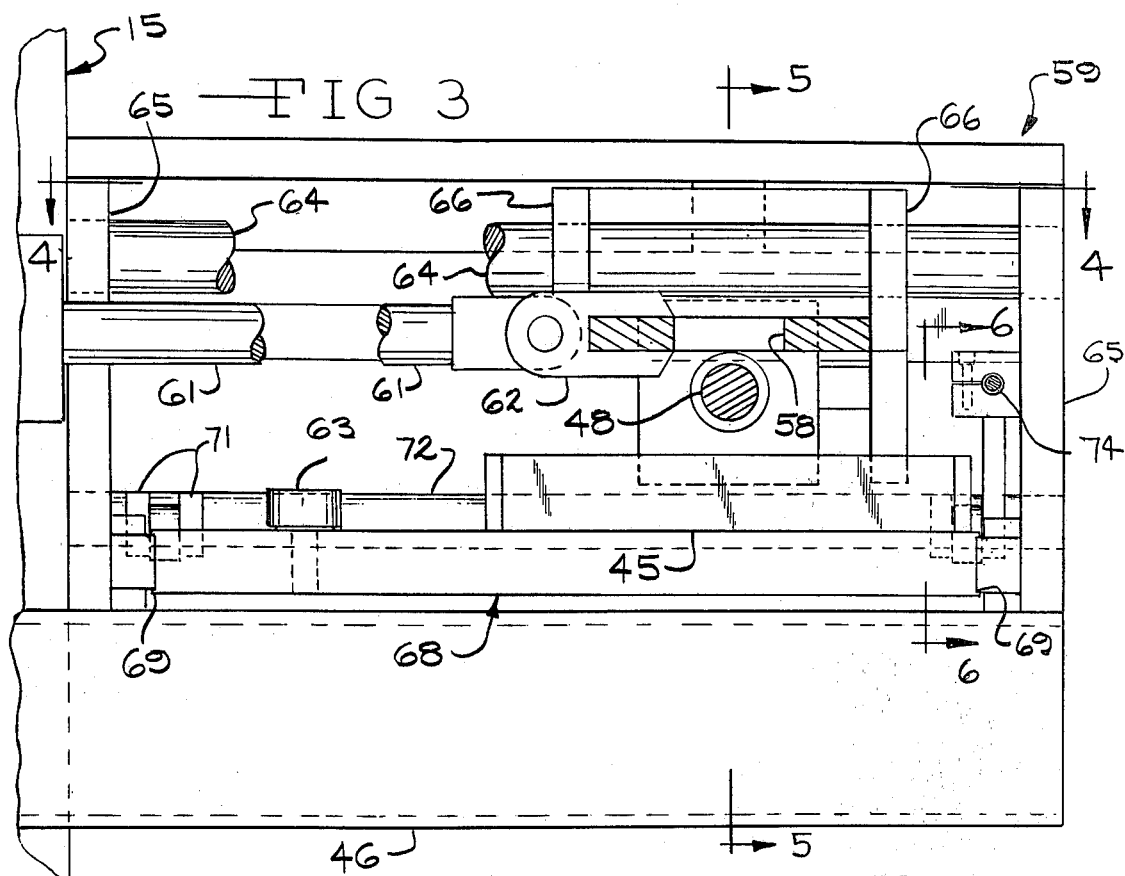
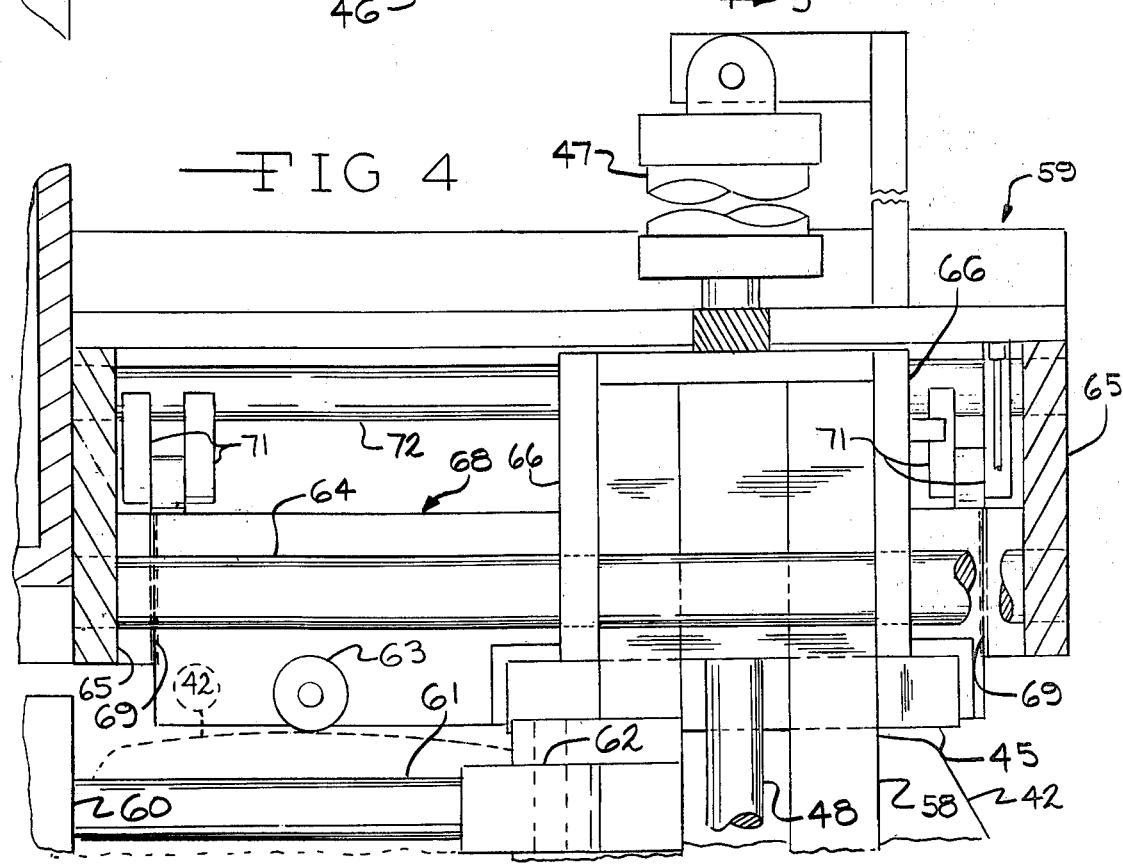

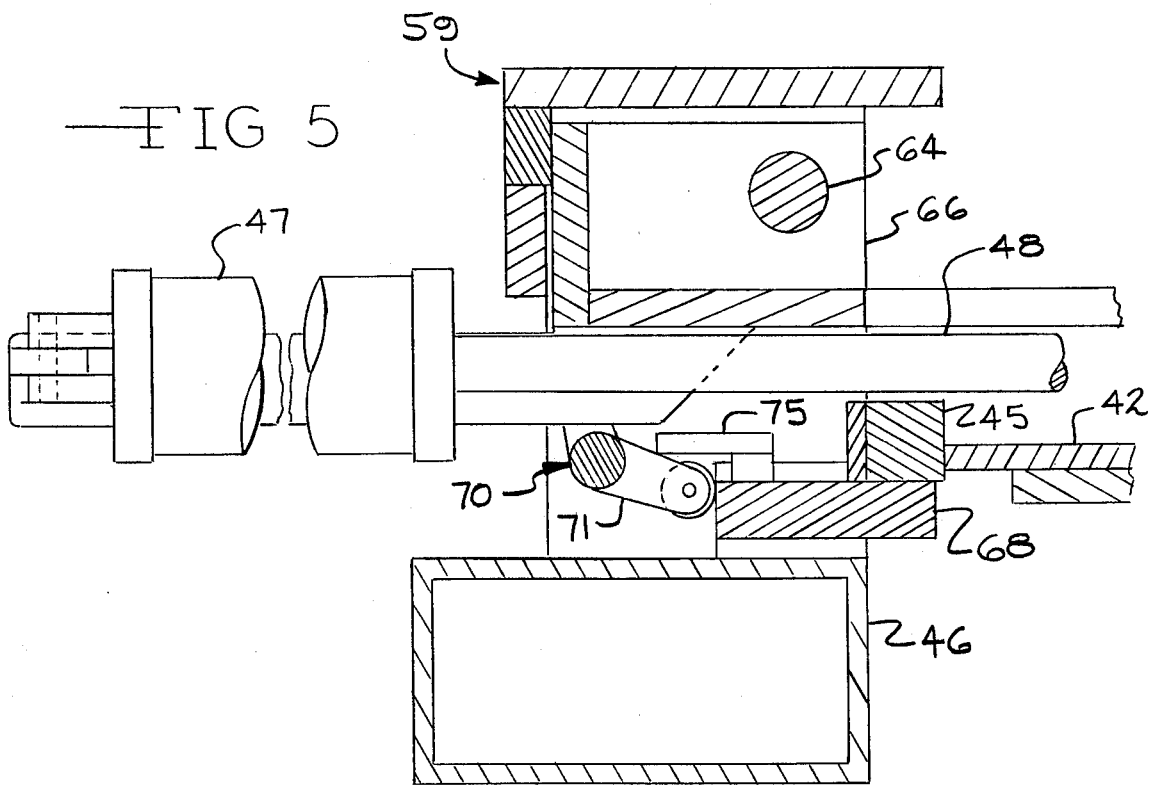
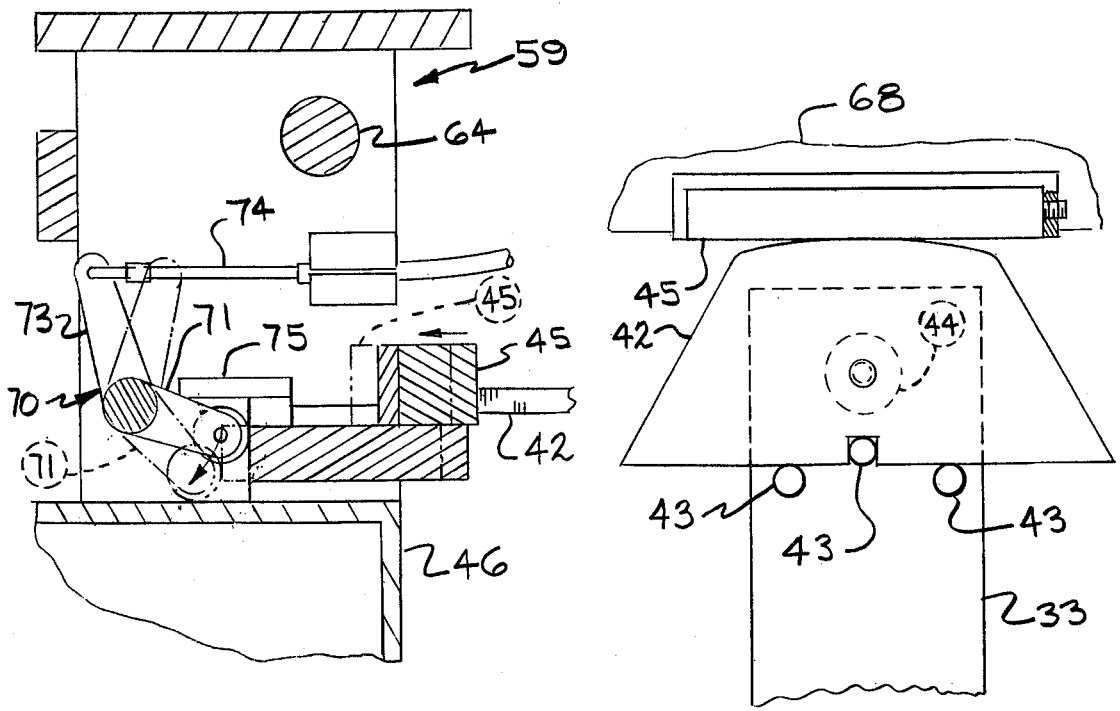

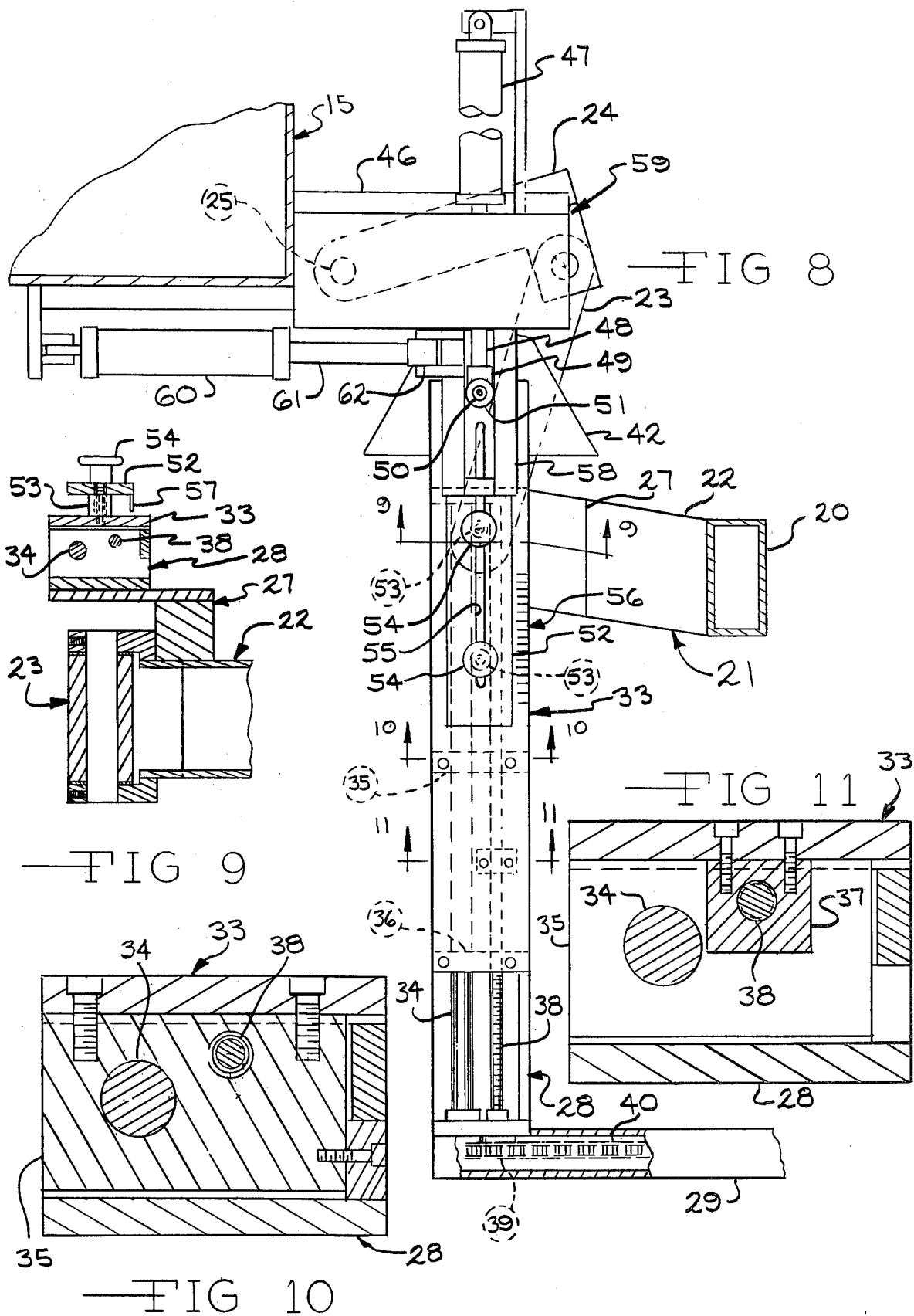

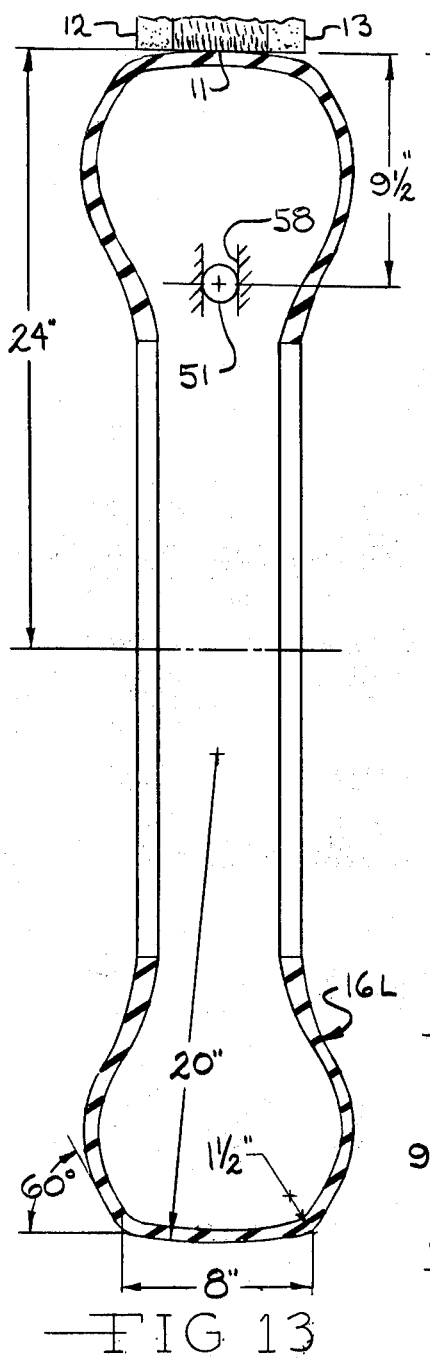
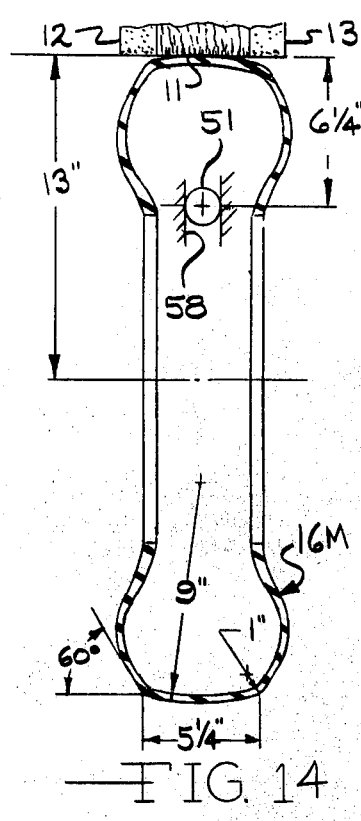
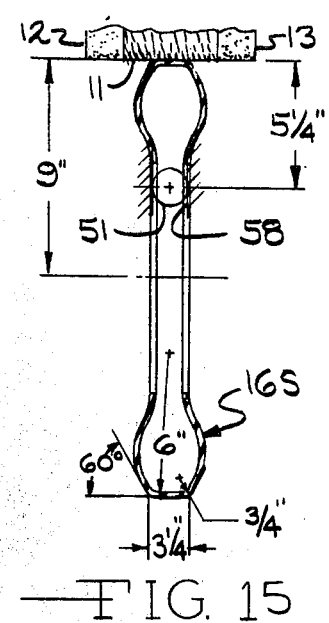
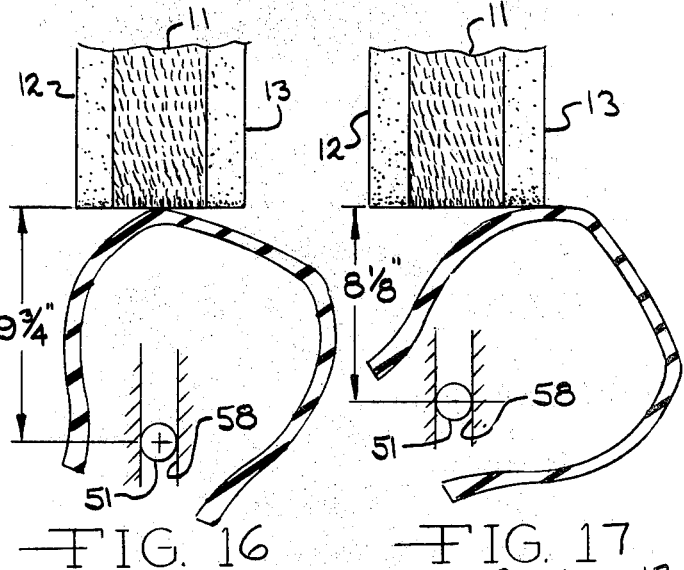
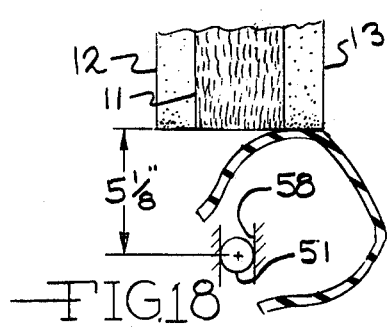
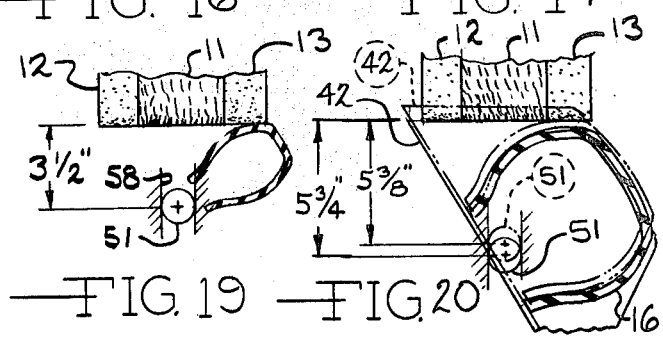

TIRE BUFFING APPARATUS

BACKGROUND OF THE INVENTION

Methods and apparatuses for the removal of the remainder of tread stock on tire casings being prepared for recapping or retreading have been developed and are widely utilized in the industry. However, because of the great variety of sizes of tire casings, measuring in outside diameter all the way, for examples, from 18 inches to 48 inches or more, and because of the differing shapes and cross-sectional profiles of the casings both because of their constructions and because of the surface which must be prepared for the adhesion thereto of treads of different configurations, many problems have not been solved.

The Rubber Manufacturers Association has established criteria for identification of the buffed profile of casings which involve four measurements. There are the crown radius which may vary, say, from 5 inches to 36 inches; shoulder radius which may vary from, say, ½ inch to 2 inches; crown width which may vary from, say 3-½ inches to 18 inches; sidewall angle, usually in the range of 45° to 60°, measured relative to the axis of the tire casing.

In discussion, the term "buffing" will be used to identify the removal of old rubber from the casing whether it is done by cutting wheels, texturizing wheels or finishing wheels.

In order to shape the buffed surfaces of casings having such widely varying measurements previous automatic apparatuses have been able to function only to perform some of the necessary buffing operations and the "eye" and manual actions of the operator have been utilized to prepare the "finished" portions of the side walls adjacent the edges of the retread material.

It is therefore the principal object of the instant invention to provide a tire buffing apparatus which is so designed as to enable the utilization of any profile template to control the buffed and finished surfaces of the casing, the template being selected according to the mentioned criteria for the particular casing being treated.

It is yet another object of the instant invention to provide a template guided buffing apparatus for shaping the surface, including the crown, the shoulder and the side wall of a tire according to a template selected by the four criteria mentioned and, in addition, as modified according to the type of tread to be adhered to the buffed casing, for example, snow tires, road tires, circumferentially grooved tires, lugged tires, etc.

Another important object of the instant invention is to provide a tire buffing apparatus having an articulated frame for mounting the tire to be buffed so designed and constructed as to enable the tire first to be treated by a rough cutting wheel in order to remove, say, 90%–95% or more of the old rubber and then to be treated by one or more texturizing and/or finishing wheels, the profile of the tire being buffed or cut away being controlled by a template selected according to its specific designation in accordance with the criteria mentioned above.

Yet another object of the instant invention is to provide a tire buffing apparatus having 2 or 3 buffing wheels, for examples, rough cutting, and/or texturizing and/or finishing wheels which successively may be utilized for shaping the surface of the tire casing to its desired profile and its surfaces to desired textures.

Yet another object of the instant invention is to provide a tire buffing apparatus in which the major portion of the buffing method is performed under the control of an appropriately selected template, which has means for over-riding the template profile by shifting the casing radially relative to the buffing wheels when desired, in order to permit the full treatment of the sidewall/tread junction areas of the casing which, for one reason or another, are not adequately finished under the control of the appropriate template.

A still further object of the instant invention is to provide a tire buffing apparatus on which casings of very different sizes and cross-sectional shapes may be mounted and their surfaces completely buffed without removal from the apparatus, with easy adjustment of the apparatus to accomodate the varying sized casings and templates for the control of their profiles, the apparatus also having adjustable and floating pivot means in order to enable the respective profile template to correctly position any particular casing being buffed.

BRIEF DESCRIPTION OF THE DRAWINGS

FIG. 3 is an enlarged, fragmentary, vertical sectional view taken along the line 3—3 of FIG. 2;

FIG. 4 is a fragmentary, horizontal, sectional view taken along the line 4—4 of FIG. 3;

FIG. 5 is a vertical sectional view taken along the line 5—5 of FIG. 3;

FIG. 6 is a fragmentary, vertical sectional view taken along the line 6—6 of FIG. 3;

FIG. 7 is a fragmentary, horizontal sectional view taken along the line 7—7 of FIG. 2;

FIG. 8 is a fragmentary substantially top plan view taken from the position indicated at line 8—8 of FIG. 2;

FIG. 9 is a fragmentary, vertical sectional view taken along the line 9—9 of FIG. 8 and shown in an enlarged scale;

FIG. 10 is a similar enlarged view taken along the line 10—10 of FIG. 8;

FIG. 11 is a view similar to FIG. 10 but taken along the line 11—11 of FIG. 8;

FIGS. 13, 14, and 15 are simplified views illustrating how casings of greatly different sizes all can be buffed on an apparatus according to the invention;

FIGS. 16 and 17 are fragmentary, partial views illustrating the positions of a casing substantially identical with the casing shown in FIG. 13 as it is swung by apparatus according to the invention for texturizing and/or finishing its surfaces;

FIG. 18 is a view similar to FIG. 17 but illustrating the casing of FIG. 14 swung over for finishing its side wall;

FIG. 19 is a view similar to FIG. 18 but showing the casing of FIG. 15 as swung into position for finishing its side wall; and FIG. 20 is a view illustrating how an apparatus according to the invention may be shifted in order to finish the side wall of a tire, in this case the tire of FIGS. 14 and 18, when its profile shape is slightly modified from that corresponding to a template for the particular tire size and shape being buffed.

DESCRIPTION OF PREFERRED EMBODIMENT

Figure 1:
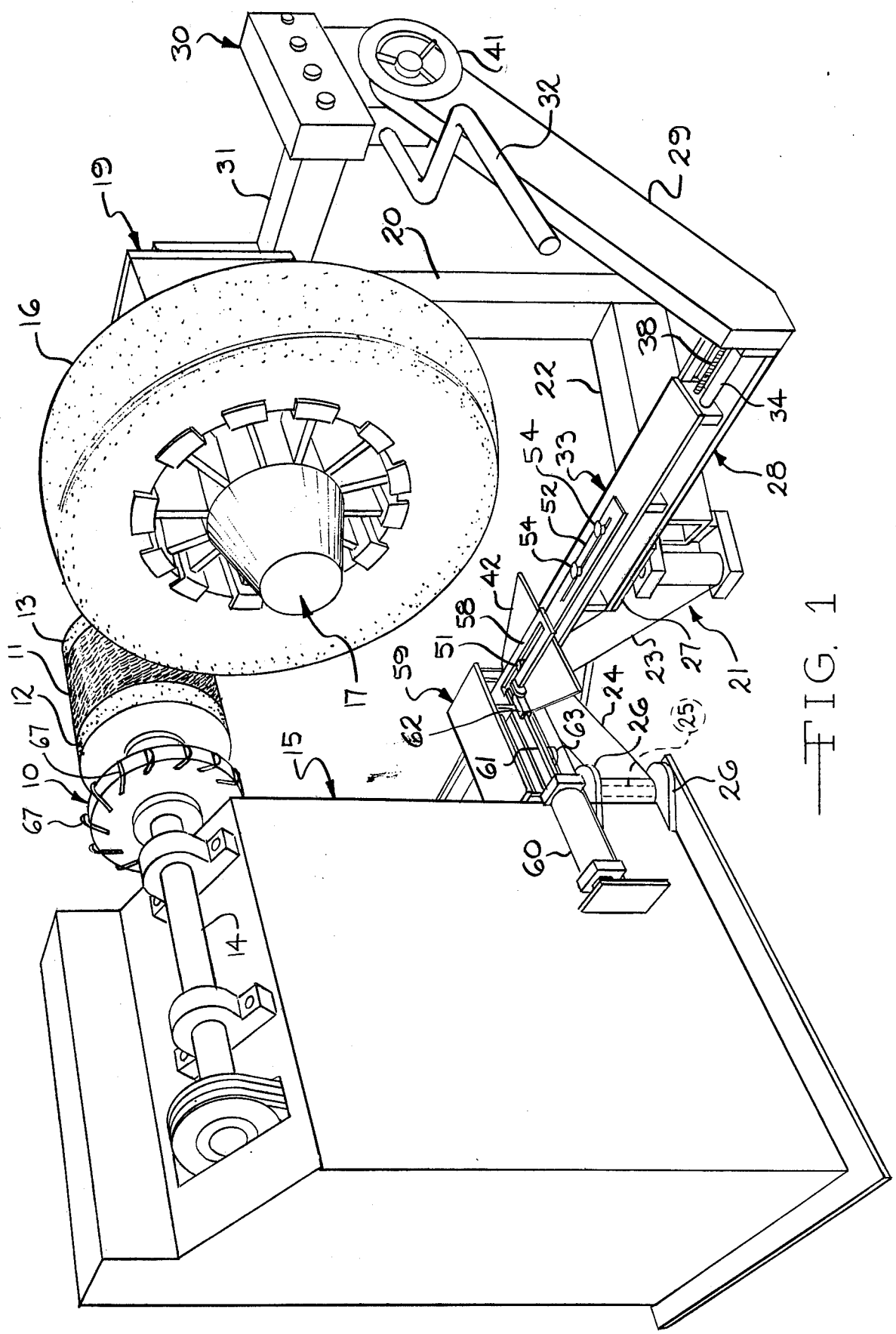
FIG. 1 is a somewhat simplified view in perspective of an apparatus embodying the invention.

A preferred embodiment of the invention as shown in the drawings and as will be described in this specification, makes possible the complete buffing of the peripheral surface, shoulders and portions of the side wall of tire casings of many sizes in accordance with any of a selected very large number of predetermined profiles and also makes possible an adjustment, when necessary, to enable the fine finishing of shoulder or side wall portions of a casing which is slightly smaller, for example, than the standard size of a casing according to its particular designation.

In conventional apparatuses a heavy rasp usually has been employed both for removing the majority of the old rubber (say 90%–95%) and for texturizing the surface of the crown as well as the shoulders. This has disadvantages because a rasp of sufficient fineness to leave a proper surface for adherence of the new tread stock removes the rubber at such a slow rate that it requires high horsepower to effectively remove a large volume of rubber in a short period of time. This also generates a large smoke and fire hazard which is undesirable with the current emphasis on occupational safety and environmental conditions.

Therefore, an apparatus embodying the invention has a rough cutting wheel 10 and, in this embodiment, has mounted coaxially therewith a rasp or texturizing wheel 11 and two finishing wheels 12 and 13. By mounting the three types of wheels on the apparatus in the way to be described below, a rough cut may first be made to remove a large volume of rubber at relatively high speed with comparatively low horsepower requirements and virtually no production of smoke, fine rubber dust or other environmental hazard; the crown surface may be rasped or texturized to the proper condition for the adhesion of the new tread stock thereto and the side walls of the casing may be smoothed off or finished to eliminate the rough cuts left behind by the rasp. This results in the entire buffing operation relative to any particular tire casing being accomplished on the same apparatus in a single operation without the necessity for an additional apparatus and a second operation, as often is necessary in prior art operations.

In an apparatus embodying the invention all of the wheels 10-13, inclusive, are mounted on a spindle 14 suitably journalled on a stationary housing or structure 15 which encloses a drive motor (not shown) for the spindle 14, controls, electrical elements, etc.

A casing to be buffed is indicated in FIG. 1 by the reference number 16, as an example the casing shown being of a medium sized passenger tire, say, 26 inches in its outside diameter or having a radius of 13 inches from its central axis to the periphery of its crown. In further discussion such a medium size passenger tire, the dimensions of which are shown in FIG. 14, will be utilized for explaining the operations of the apparatus and will be indicated by the reference number 16-M for "medium". Similarly, in further discussions a much larger tire such as a truck tire having, for example, an outside diameter of 48 inches or a radius of 24 inches around its normal axis, as shown in FIG. 13, will be indicated by the reference number 16-L and a much smaller casing such as one having an 18 inch outside diameter or a radius of 9 inches around its normal axis, as shown in FIG. 15, will be indicated by the reference number 16-S.

Any casing to be buffed is mounted upon an expansible mandrel mechanism 17, hereinafter called a "rim", which is a conventional device well known in the art and which therefore will not further be described except to state that its effective diameter can be reduced or expanded in order to accomodate tires of varying sizes, such as those discussed herein, or even larger or smaller if necessary. The rim 17 is mounted for rotation on an axis 18 (FIG. 2) which is parallel to and spaced from the spindle 14. The axis of the rim 17 is aligned with the spindle 14 so that the surfaces of the wheels 10-14 engage the surfaces of the casings being buffed along a line connecting the axes of the rim 17 and casing and the cutting wheels 10-13 as can best be seen in FIG. 2.

The rim 17 and its shaft (not shown) extend horizontally from a drive motor and transmission located interiorly of a drive housing 19 which, in turn, is positioned at the upper end of a post 20. The post 20 is carried on an articulated frame generally indicated by the reference number 21. The frame 21 (see also FIG. 8) consists of the arm 22, a second arm 23 to which the arm 24 is pivotally connected and which, in turn, is pivotally mounted by a heavy vertical pin 25 that is journalled in ears 26 at the base of the structure 15. The articulated frame 21 provides for movements of the post 20 and any particular tire casing 16 supported thereby both in a transitory manner toward and away from the wheels 10-13 and angularly relative thereto to provide for treatment of the entire profile area of a casing 16 and, in a larger angular and transitory manner in order to remove a casing from the rim 17 or to put a new casing on the rim 17. The way of movement of the articulated frame 21 to accomplish these necessary objectives will be further described below.

The arm 22, near its end which is pivotally connected to the arm 23, carries a bracket 27 (see also FIG. 8 and 9). The bracket 27 mounts one end of a slide frame 28, the other end of which is rigidly connected to a hollow casing 29. The casing 29 extends upwardly and angularly to a control box generally indicated by the reference number 30, that is, in turn, mounted on the end of a horizontal strut 31 rigidly assembled with the drive housing 19 and the post 20. By reason of this construction, the framework comprising the post 20, arm 22, bracket 27, side frame 28, casing 29, control box 30 and strut 31 is a rigid structure which moves as a unit and maintains its configuration as illustrated in FIG. 1. This entire structure comprising the parts just enumerated pivots with the articulated frame arm 22 to move the casing relative to the wheels 10-13 in both transitory and angular movements. Handle 32 is utilized by the operator of the apparatus to move this framework relative to the wheels 10-13.

The slide frame 28 mounts a template slide, generally indicated by the reference number 33, which is guided for movement in the frame 28 by a guide rod 34, the guide rod 34 extending through two vertical blocks 35 and 36 (see FIGS. 8 and 10, particularly). A nut 37 (FIG. 11) also is mounted on the slide 33 and is engaged with a threaded shaft 38 extending parallel to the guide rod 34 from one end of the slide frame 28 to the other. A sprocket 39 (FIG. 8) is pinned on the end of the threaded shaft 38 and is engaged with a chain 40 extending upwardly interiorly of the casing 29, the other end of the chain being engaged with a second sprocket (not shown) mounted on a shaft for a feeding wheel 41 located at the upper end of the casing 29 near the control box 30 (FIG. 1).

Figure 2:
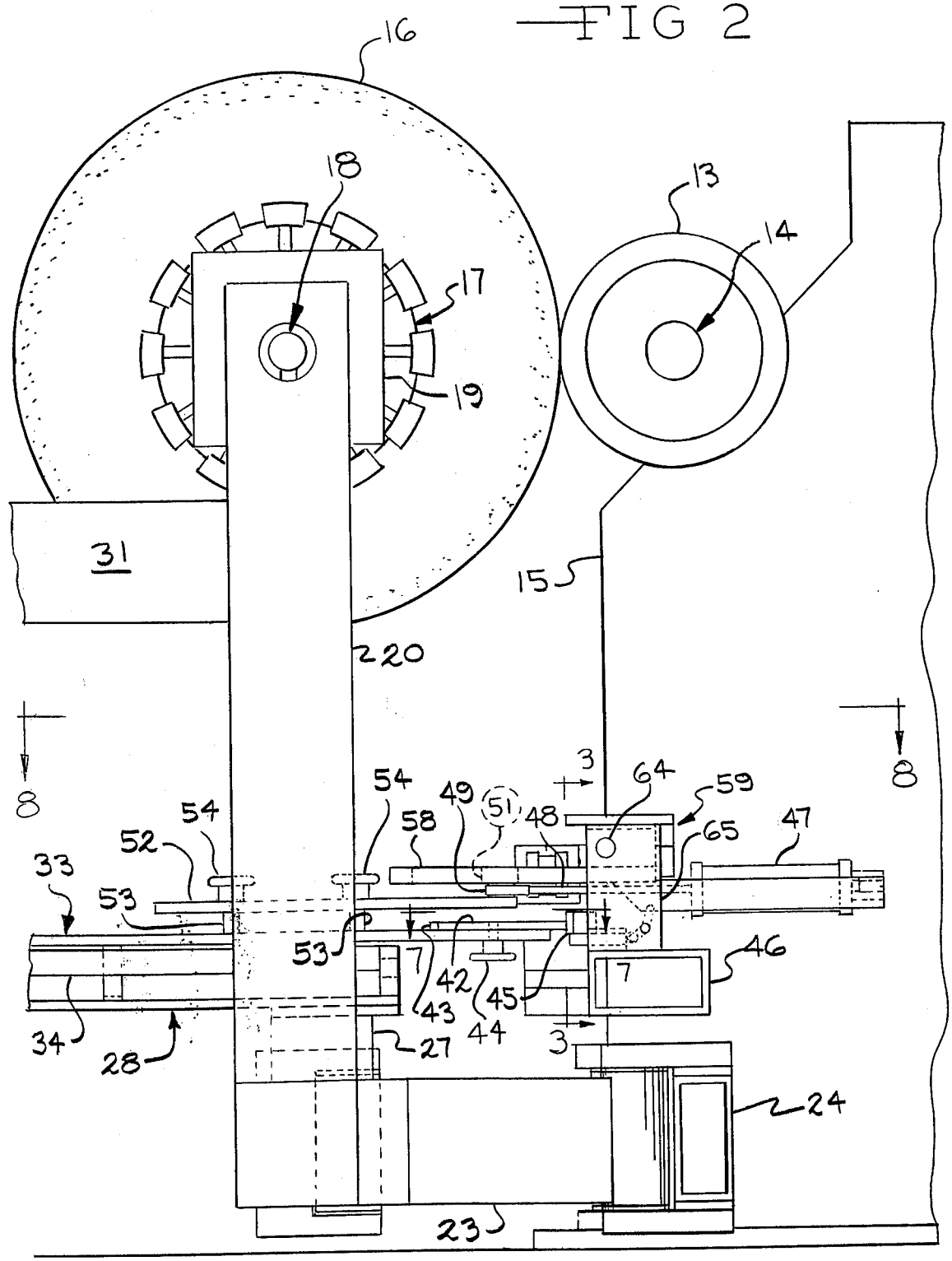
FIG. 2 is a fragmentary view, partly in elevation and with parts shown in phantom, taken generally from the right side of the apparatus shown in FIG. 1.

The template slide 33 removably mounts any selected one of a plurality of tire profile templates, such as a template 42 shown in the drawings, particularly in FIG. 1, 2, and 7. The template 42 shown is that which would be employed for a standard passenger tire of the type having dimensions such as those illustrated in FIG. 14. The template 42 (FIG. 7) is positioned on the template slide 33 by three short dowel pins 43 and locked in place by a hand knob and screw 44 (see also FIG. 2) which extends upwardly through an opening in the slide 33 and is threaded into the particular template 42.

As can best be seen in FIGS. 2 and 7, the template 42 bears against the surface of a template guide block 45 which is adjustably mounted on a massive support tube 46 which extends horizontally from the structure 15.

The template 42 and its slide 33 are urged toward and maintained in contact with the template guide block 45 during the buffing operation by a pneumatic cylinder 47, which has a rod 48 on the end of which there is a yoke 49. The yoke 49 extends around a stub shaft 50 (FIG. 8) for a roller 51. The stub shaft 50 is pinned in the end of a movable plate 52 that is supported on two short posts 53 which protrude upwardly from the template slide 33 and which are aligned along its center line. A pair of hand knobs 54 have stems which extend through an elongated slot 55 cut in the plate 52 so that the plate 52 can be moved relative to the slide 33 and locked in its selected position. Suitable indicia indicated by the reference number 56, are inscribed along the slot 55 and an indicator 57 (FIG. 9) is mounted on the plate 52 so that the position of the plate 52 and thus the roller 50 properly can be determined for any particular size of tire.

The roller 51 extends between the arms of a bifurcated guide 58 that is mounted in and extends forwardly from a cross frame generally indicated by the reference number 59.

The roller 51 functions as a floating pivot about which the articulated frame and the casing are swung under control of the respective template 42. By comparing, for example, FIGS. 13, 16, and 17, it will be seen that the center of the roller 51 moves as the casing 16-L is swung through the positions illustrated in FIGS. 13, 16, and 17, from a distance of 9-½ inches from the surfaces of the wheels 10-13 to a distance of 8-⅛ inches to maintain the template in contact with the template guide block 45 and to maintain the surface of the casing in proper contact with the respective ones of the wheels 10-13 in order that it will be cut, texturized and finished to a profile determined by the respective template 42.

In order to move the casing 16 axially so that its surface can be brought against the rough cutting wheel 10 and, thereafter, into contact with the texturizing wheel or rasp 11 and the finishing wheels 12 and 13, the entire articulated frame 21 is shifted axially of the casing 16 by energizing a pneumatic cylinder 60 (FIGS. 1 and 8) that is mounted on the structure 15. The cylinder 60 has a rod 61 and, on the end of the rod 61 there is a clevis 62 (see also FIG. 3) that grasps and is secured to one side of the bifurcated plate 58. When the cylinder 60 is energized, it pulls in its rod 61 and, through the connections just described, shifts the entire articulated frame 21 laterally a sufficient distance to bring the rough cutting wheel 10 into position for cutting away the majority of the old tread stock on the surface of the casing 16. This lateral translatory movement of the articulated frame 21 and the casing 16 and, as best can be seen in FIGS. 3 and 4, of the template 42, moves the template 42 into engagement with the periphery of a guide roller 63 tangential to the vertical plane of the front face of the template guide block 45 in its normal position (see FIG. 4, particularly) where the template 42 is shown in solid lines in engagement with the guide block 45 and in broken lines in engagement with the guide roller 63.

The movement of the template 42, the bifurcated guide 58, the associated cylinder 47 and its rod 48 and, thus, the articulated frame 21 and the casing 16 are all guided in this lateral movement by a horizontal guide rod 64 which extends between end plates 65 of the cross frame 59 and through spaced side plates 66 which also function to guide the movement of the bifurcated plate 58 at its outermost end.

When the operator wishes to buff the surface of a particular casing, he deactivates the cylinder 47 or, if it is double-acting, he switches the air valve so that the cylinder 47 extends its rod 48, pushing the pivot roller 51 to the forward end of the slot between the arms of the bifurcated plate 58 (to the left in FIG. 2). He then swings the articulated frame 21 around in a counterclockwise direction (FIGS. 1 and 12), pivoting the frame 21 around the roller 51. The particular casing to be buffed is then mounted on the expandible hub 17 and locked in place. The proper one of the various templates 42 for the particular tire profile which is to be buffed is selected according to the specifications established by the Rubber Manufacturers Association criteria as mentioned earlier.

For examples, the several casings of different sizes of which cross-sections are shown in FIG. 13, 14, and 15 have rather dramatically different dimensions. These particular sizes and the dimensions given therein of course are merely illustrative and, by reason of the adjustments provided by the various control features of an apparatus according to the invention, casings of many sizes and profiles readily can be buffed by the selection of appropriate templates and the adjustment of the various positions of the plate 52 and thus the pivot roller 51 and the template slide 33.

After selection of the proper template, the operator places it in the position illustrated in FIG. 7, particularly, and swings the articulated frame 21 back into the position shown in FIG. 1. While he is moving the frame 21 to the position shown in FIG. 1 he "backs off" the casing 16 relative to the template 42 by rotating the hand wheel 41 and the threaded shaft 38 to move the template slide 33 and the template 42 toward the template block 45 relative to the casing 16. He then activates the cylinder 47 to pull the template 42 into contact with the template guide block 45. The cylinder 60 is activated to shift the entire articulated frame 21 laterally to the left, bringing the template 42 into engagement with the guide roller 63. This centers the casing 16 relative to the rough cutting wheel 10. The motors to rotate the cutting wheels 10-13 and the casing are then energized. The operator turns the feeding wheel 41 to move the casing 16 into engagement with the rough cutting wheel 10, continuing this movement in a direction normal to the axis of the cutting wheel 10 and the casing 16, until he has cut into the remaining tread stock on the casing 16 to a depth to remove the necessary excess rubber.

The rough cutting wheel 10 is shown as having a plurality of protruding, hollow circular cutters 67 which have been proven to be very effective for removing old rubber at high speed and with little, if any, smoke or rubber dust. But the particular configuration thereof is not a part of the instant invention. It should be noted, however, that the maximum diameters of the rough cutting wheel 10 and the wheels 11-13 are the same and that the template contacting surface of the template guide block 45 and the template guide roller 63 each has the same configuration as the wheels 11-13 and wheel 10, respectively, beneath which it is positioned.

After the casing 16 has been moved over to the rough cutting wheel position, and the feeding wheel 41 rotated to feed the casing into the rough cutting wheel 10 to its initial depth, the operator swings the articulated frame 21 around the floating pivot roller 51 with the cylinder 47 actuated to hold the template 42 against the surface of the template guide roller 63 to remove the excess rubber from crown portion of the casing to the desired profile. After removal of the majority of the old tread rubber from the casing 16, the operator actuates the cylinder 60 to extend its rod 61 and shift the articulated frame 21 laterally to the position actually depicted in FIGS. 1 and 2 and in solid lines in FIG. 12, so that the casing surface is aligned with the rasp or texturizing wheel 11. It will be appreciated that the cutting peripheries of the cutting wheels 10 and 11, as well as the finishing wheels 12 and 13, all are tangential to the same vertical plane in which the surfaces of the template guide block 45 and the template guide roller 63 also lie.

The operator then swings the articulated frame 21 around the pivot roller 51 as guided by the template 42 to texturize the crown of the casing, the adjacent shoulder radii portions and, perhaps, the immediately adjacent portions of the sidewalls of the casing. This movement of the articulated frame 21 with the casing in contact with the rasp or texturizing wheel 11 would be from the solid line position of FIG. 12 to approximately the dotted line position of FIG. 12 or perhaps to a slightly greater angle on both sides of the center position.

A rasp or texturizing wheel 11 usable in an apparatus according to the invention may be a conventional buffing rasp having a plurality of short circumferentially extending cutting blades, tack-like points or other similar abrading means, which "texturizes" or suitably roughens a generally smooth contoured surface in order to provide for adequate adhesion between the tire casing and the material of the new tread stock.

As can be seen, particularly in FIGS. 12, 13-15 and 16, the rasp or texturizing wheel 11 is employed to prepare the surface of the crown and the short shoulder radii portions of the casings. The actual profile of these portions of a tire casing is of course cut roughly by the cutting wheel 10 as controlled by the particular template 42 and texturized to a finished contour by the wheel 11 also under the control of the particular template 42 selected for that casing.

Figure 12:
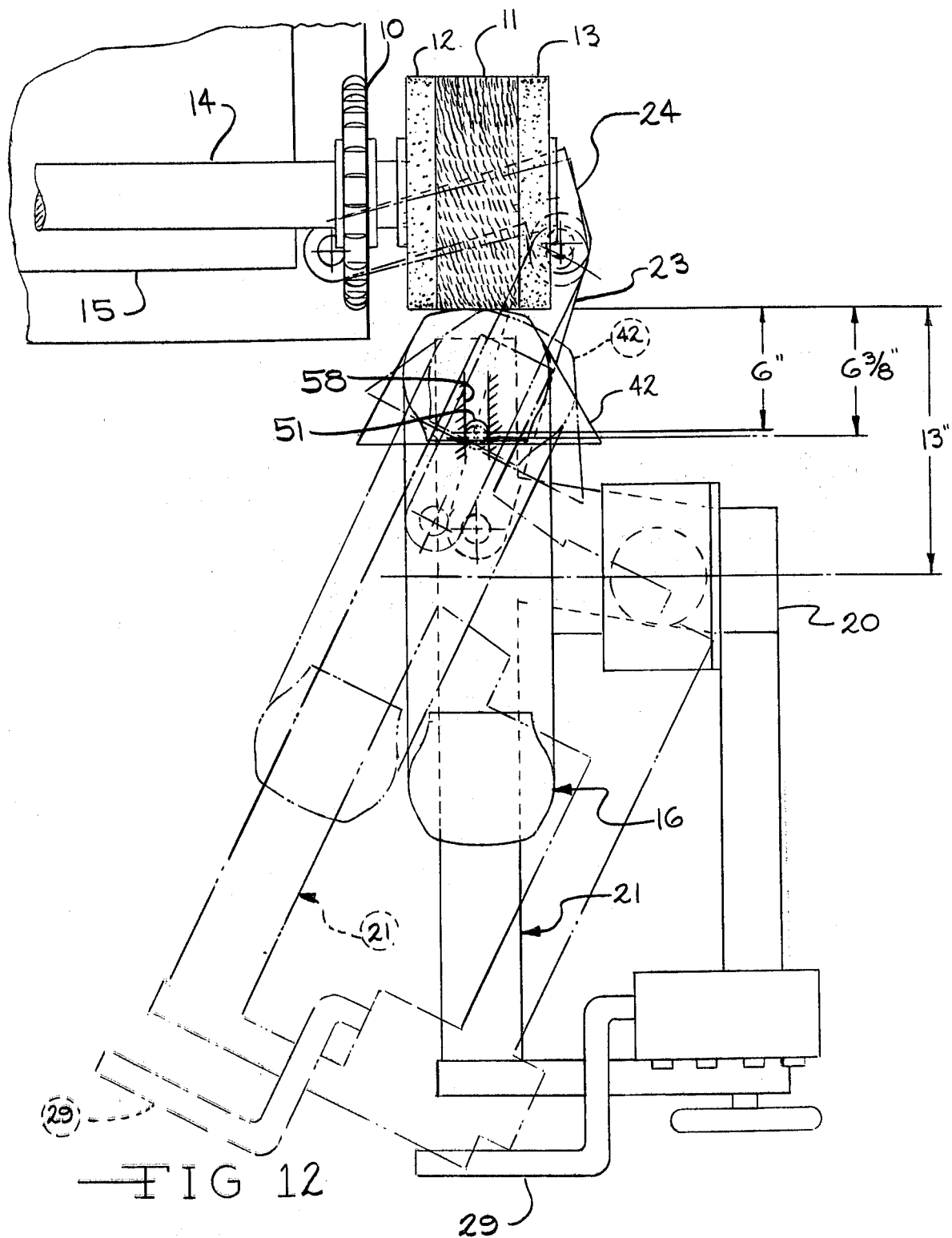
FIG. 12 is a simplified, diagrammatic, fragmentary plan view of the apparatus shown in FIG. 1 illustrating how the template control of the tire is provided and how the floating pivot means are utilized in order to insure proper contact of the surface of the casing with the buffing wheels.

After the articulated frame 21 and the casing 16 have been swung to the position illustrated in broken lines in FIG. 12 and, for example, in FIG. 16, the frame 21 and casing 16 are swung in a counter-clockwise direction around the center line (FIGS. 12 and 16) to texturize the opposite portions of the crown and the opposite shoulder radius. It may also be noted by comparing, for example, FIGS. 13 and 16, that as the casing is swung from the central position illustrated in FIG. 13 to the angular position illustrated in FIG. 16 and in dotted lines in FIG. 12, the floating pivot 51 moves in its slot in the bifurcated guide 58 as controlled by the template 42.

Thereafter, the articulate frame 21 and the casing 16 are swung to a greater angular degree to one side and the other of the center in order to engage the sidewall portions of the casing with first one and then the other one of the finishing wheels 12 and 13. This smooths off or "finishes" the casing sidewall surfaces so that when the new tread stock is adhered to the casing the appearance of the sidewalls at the edge of the new tread stock will be identical with that of the original casing. The finishing wheels 11 and 13 often are merely grinding wheels have relatively fine abrading particles imbedded in their surfaces, or similar wheels, which are capable of a fine, smooth, surface treatment.

In some instances, when a particular casing has a cross-sectional width less than standard or has been damaged so that it is necessary to remove more rubber from its surface than ordinarily would be removed by the successive treatments described above, the operator is given the opportunity to move the casing radially relative to the wheels 10-13 in order that the extra rubber may be buffed away and the injury smoothed out. The mechanism enabling the operator thus to accomplish this result consists of structure by which the template guide block 45 and the template guide roller 63 both may be shifted radially inwardly relative to the vertical plane to which the surfaces of the wheels 10-13 are tangential.

As can best be seen in FIGS. 3 and 4, the template guide block 45 and the guide roller 63 are both mounted on a slide plate 68 which is guided in the cross frame 59 by ways 69. The slide plate 68 ordinarily is held at its forward position (solid lines FIGS. 5 and 6) by a bell crank 70 which has spaced lower arms 71 that normally are engaged with the rear side of the slide plate 68 and are thus shown in solid lines in FIGS. 5 and 6 (See also FIGS. 3 and 4). The bell crank 70 is carried by a shaft 72 which extends across the cross frame 59 parallel to the guide rod 64 and is mounted in the end plates 65. The bell crank 70 also has an upper arm 73 (FIG. 6) connected to the end of a cable 74, the other end of the cable extending upwardly to near the control box 30, but not being shown in the drawings. It will be remembered that the template 42 is continuously urged against the template guide block 45 or the guide roller 63, as the case may be, by the action of the cylinder 47 which is yoked to the pivot roller 51 and thus to the articulated frame 21. The bell crank 70 normally is held in its upper position (FIG. 5) with its lower arms 71 against an overlying stop 75 to prevent the slide plate 68 from being moved inwardly (to the left in FIGS. 5 and 6).

When the operator wishes to buff more deeply into any of the surfaces of the casing being treated, he pulls the cable 74, swinging the bell crank 70 in a clockwise direction from its solid line position in FIG. 6 to its broken line position in that figure. This allows the template 42 and the casing 16 to move closer to the axes of the wheels 10-13, the cylinder 47 pulling the articulated frame 21 inwardly to maintain the template 42 in contact with the guide block 45 in its inner position (shown in dotted Lines in FIG. 6) or with the guide roller 63 which also is moved inwardly when the bell crank 70 is swung downwardly.

After this unusual step the template guide block 45 and the guide roller 63 automatically move to their outer normal position. The cylinder 47 either is deenergized or its air controls reversed so that it extends its rod 48 and pushes the articulated frame 21 outwardly to the limit of movement as determined by the engagement of the floating pivot roller 51 with the outer end of the slot in the bifurcated guide plate 58.

The action just described is illustrated in FIG. 20 where the template 42, floating pivot roller 51 and the casing 16 are all shown in solid lines in their normal position and in broken lines in their inner position relative to the wheels 11-13, as may be required to deal with an under-size casing or remove an injury or blemish which is not present in a usual casing.

As can be best understood by reference to FIG. 12, an apparatus according to the invention has an advantage which results from the retractible template guide block 45 and guide roller 63. It is apparent that the casing 16 could be moved along the lines of the template slide 33 by rotating the threaded shaft 38 in order to move the casing 16 closer to the wheels 10-13 when necessary. However, it this were done, the wheels 10-13 would have to be much wider so that they would extend over to the points where the side walls of the casing 16 could be brought into engagement. By moving the template guide block 45 and guide roller 63 as described, the wheels can be narrow and all surfaces of the casing 16 be cut more deeply than normal if necessary.

Having described our invention, we claim:

1. In a tire buffing apparatus including in combination:
    a housing
    movable frame means supported with respect to said housing, said movable frame means adapted to receive and mount a tire casing for rotation on a normal axis, said axis of rotation of said tire casing being movable within a plane,
    a texturizing wheel and one finishing wheel on each side of said texturizing wheel, said wheels being rotatably mounted on said housing on an axis substantially within the plane of the axis of rotation of the tire casing,
    cam means mounted to said housing, said cam means corresponding to the shape of said texturizing and said finishing wheels,
    linear guide means mounted to and extending outwardly from said housing and lying in a plane which besects and is perpendicular to the rotational axis of the said texturizing wheel,
    template guide means mounted to said movable frame, said template guide means corresponding to the desired profile of a buffed tire casing, and
    cooperating means mounted to said movable frame and engageable with said linear guide means wherein the movement of said movable frame engages said template guide means with said cam means while said cooperating means and said linear guide means maintains a predetermined point which is substantially on the bisector of the tire casing perpendicular to the axis of the rotation of the tire casing on a line in a plane which bisects and is perpendicular to the rotational axis for said texturizing wheel and substantially perpendicular to the axis of rotation of said wheel thereby permitting engagement of said texturizing wheel with the crown of the tire casing and permitting engagement of said finishing wheels with predetermined portions of the sidewalls of the tire casing.

2. The tire buffing apparatus in accordance with claim 1 further including actuating means for moving said template guide means and said movable frame in a direction normal to the axis of said wheels, whereby the tire casing may be moved radially closer to said texturizing wheel and said finishing wheels during the buffing operation.

3. The tire buffing apparatus in accordance with claims 1 further including a rough cutting wheel mounted adjacent said texturizing wheel and said finishing wheels, said rough cutting wheel being rotatably mounted on said housing on said axis substantially within the plane of the axis of rotation of the tire casing and cam roller means mounted to said housing and corresponding to the shape of said rough cutting wheel.

4. The tire buffing apparatus in accordance with claim 1 further including means for urging said movable frame and said template guide means towards said cam means mounted on said housing for maintaining said template guide means in contact with said cam means.

5. The tire buffing apparatus in accordance with claim 1 further including indicator means on said movable frame for positioning said template guide means relative to the axis of said casing rim according to the outside diameter of said tire casing being buffed.

6. The tire buffing apparatus in accordance with claim 3 further including resilient means on said housing for moving said movable frame and said tire casing thereon in a direction parallel to the axis of said rough cutting and said texturizing and finishing wheels for predeterminely positioning said casing for selective engagement with one of said cutting wheel or said texturizing and finishing wheels.

7. The tire buffing apparatus in accordance with claim 1 wherein said texturizing and said finishing wheels are mounted to a motor driven spindle rotatably journaled to said housing.

8. The tire buffing apparatus in accordance with claim 1 wherein said cooperating means includes a pivot member adjustably mounted on said movable frame and movable along said linear guide means.

9. The tire buffing apparatus in accordance with claim 1 wherein said frame means is an articulated frame.

10. A method of completely buffing a tire carcass including the steps of:
    mounting a tire casing on a motor driven spindle attached to a movable frame for rotation thereof, said movable frame supported with respect to a housing, said housing including a cam corresponding to the shape of a texturizing wheel and a finishing wheel on each side of said texturizing wheel, all of said wheels rotatably mounted on said housing on an axis substantially within the plane of the axis of rotation of said tire casing,
    selecting template guide means corresponding to the desired profile of a buffed tire casing and mounting the same to said movable frame, and
    engaging said template guide means with said cam, maintaining a predetermined point which is substantially on the bisector of said tire casing perpendicular to the axis of rotation of said tire casing on a line in a plane which bisects and is perpendicular to the rotational axis of said texturizing wheel and substantially perpendicular to the axis of rotation of said wheel thereby texturizing the crown of said tire casing and finishing predetermined portions of the sidewalls of said tire casing.

11. The method in accordance with claim 10 further including the step of moving said cam with respect to said wheels thereby overriding the limiting position of said template guide means.

12. The method in accordance with claim 10 further including the steps of shifting the movable frame and engaging the template guide means with a cam roller correspoinding to the shape of a rough cutting wheel rotatably mounted on said housing on said axis substantially within the plane of the axis of rtation of the tire casing to permit the rough cutting wheel to engage the tire carcass.

* * * * *